United States Patent
Aharon

(10) Patent No.: US 10,181,816 B2
(45) Date of Patent: Jan. 15, 2019

(54) CURTAIN WALL WITH VARIABLE HEAT TRANSFER COEFFICIENT

(71) Applicant: Oren Aharon, Haifa (IL)

(72) Inventor: Oren Aharon, Haifa (IL)

(73) Assignee: Oren Aharon, Haifa (IL)

( * ) Notice: Subject to any disclaimer, the term of this patent is extended or adjusted under 35 U.S.C. 154(b) by 0 days.

(21) Appl. No.: 15/227,982

(22) Filed: Aug. 4, 2016

(65) Prior Publication Data

US 2018/0041162 A1   Feb. 8, 2018

(51) Int. Cl.
| | |
|---|---|
| *H02N 6/00* | (2006.01) |
| *H01L 31/042* | (2014.01) |
| *H02S 40/44* | (2014.01) |
| *H02S 20/22* | (2014.01) |
| *F24S 20/60* | (2018.01) |
| *F24S 70/65* | (2018.01) |
| *F24S 20/63* | (2018.01) |
| *F24S 20/66* | (2018.01) |

(52) U.S. Cl.
CPC .............. *H02S 40/44* (2014.12); *F24S 20/60* (2018.05); *F24S 20/63* (2018.05); *F24S 20/66* (2018.05); *F24S 70/65* (2018.05); *H02S 20/22* (2014.12)

(58) Field of Classification Search
CPC ......... H02S 40/44; H02S 20/22; F24J 2/0422; F24J 2/0494
USPC .......................... 126/621, 572, 595, 630, 669
See application file for complete search history.

(56) References Cited

U.S. PATENT DOCUMENTS

| | | | | |
|---|---|---|---|---|
| 3,964,678 A | * | 6/1976 | O'Hanlon | E06L 37/02 126/630 |
| 3,990,635 A | * | 11/1976 | Restle | E06B 9/24 126/591 |
| 5,221,363 A | * | 6/1993 | Gillard | E06B 9/264 136/248 |

OTHER PUBLICATIONS

Pro Se Assistance Program flyer (Year: 2017).*

* cited by examiner

*Primary Examiner* — Angelo Trivisonno

(57) ABSTRACT

A curtain wall or roof element, with built in solar panel or heat absorbing layer, and at least one blower for air circulation inside the enclosed device, one or more temperature sensors monitoring the temperature inside and outside the device and a microcontroller activating the blower according to predetermined program to heat or cool the room enclosed by the device. If solar cells or panels are used they will generate electrical power and heat. It is the purpose of this invention to increase the energy harvesting coefficient from the sun's radiation by utilizing the absorbed heat for increasing the temperature in a space enclosed by said device, moreover the smart configuration of the curtain wall will enable to change the system's isolation characteristics by changing its U values. U value of a curtain wall describes the heat isolation characteristics of the device in a numerical form.

3 Claims, 5 Drawing Sheets

CURTAIN WALL WITH VARIABLE HEAT TRANSFER COEFFICIENT

BACKGROUND

The invention concerns a module with an adjustable heat coefficient and embedded photovoltaic solar cells or a heat absorbing layer. Multiple modules connected together and laid as a building facade or a skylight roof will be used as an outer envelope of a building, in particular for use as a curtain wall or roof element, with at least one outer pane facing towards the incident light, consisting of at least one inner layer of solar cells or light absorbing element arranged at a distance behind outer plane and a second preferable transparent element arranged in a distance behind the solar cells. This arrangement is producing at least two enclosed cavities; one in front of solar cells plane and the second behind the solar cells or light absorbing plane, producing interspaces. Sunlight penetrating through first transparent layer is absorbed by second solar cells layer to produce electricity and heat at ratio of about 15% electricity and about 60% heat, it is the purpose of this invention to provide the interior of building with smart energy harvesting of both heat and solar electricity—this is achieved by controlling the U value of the two enclosing cavities by heat convection. Two cylindrical fans installed inside the two cavities on their outer perimeter frame, without obstructing the transparent plane facing the sun, will independently control the air convection through the cavities thus controlling the heat flow from solar cells layer through the air cavity.

Modules of this type will be generally assembled as a curtain wall or skylight producing a building envelope. For such applications the modules are mechanically attached to the buildings' inner frame, and the electrical inter connections are provided by separate connectors.

SUMMARY

The building industry is struggling to provide better solutions for buildings with low energy consumption and high levels of well-being to the occupant.

Glass double façade have been increasingly built in recent years, mainly due to their superior architectural appearance.

Advanced façade technology allows increased occupant comfort on one hand and reduced energy consumption on the other, whereas energy consumption is reduced by passive means such as protection against solar radiation, noise insulation and daylight illumination. Recent technologies allow further advance in energy saving by incorporating solar cells into the buildings' curtain wall. This curtain wall technology is gaining increased popularity in South China and in Europe.

This invention allows electrical Energy harvesting from the façade (circa 14%) and additional heat harvesting from the other hand. Moreover, the BIBV façade also provides reduced solar direct radiation. The main obstacle to the wide acceptance of technologies with integrated solar cells into the curtain wall is the excessive heat generated by solar cells. Although of merit during winter time this heat is a great obstacle during summer time, creating extra heat loads to the building air-conditioning system as well as structural stress due to expansion of Glass skin.

It is the purpose of this invention to solve the extra heat load problem by a smart active curtain wall capable of heat management by changing the U value of the transparent envelope.

The technology incorporates a preferable PV layer incorporated into a hermetically sealed ventilated smart double glassing. Built in sensors will activate ventilation to transfer excessive heat to building interior or expelling it to the outside according to building requirements. This technology will not only solve the excessive heat problem but will also increase the overall efficiency of solar cells whenever building heating is required.

It is the purpose of the invention to provide a solar module as stated, providing electrical solar energy combined with heating capability of an interior enclosed by the modules. Moreover, the stated module will be equipped with smart features, enabling control of heat transfer parameters of module adapting its heat transfer characteristics to measured temperatures outside the building and inside the building. A special built in microcontroller will control the heat transfer by activating the built in axial fans.

Thus, according to the invention, provision is made for the smart module to be used as a curtain wall for buildings, creating a smart skin-like envelope, with solar energy harvesting capability combined with an adaptive heat transfer coefficient.

Preferred embodiments of the invention incorporate a solar absorbing layer preferable consisting from a solar panel encapsulated in two inner and outer transparent layers, provided with one or more fan elements capable of circulating the enclosed air in-between the layers. In order to control the fan activity and thus change the heat transfer characteristics of device, temperature sensors among others are mounted on the exterior of device as well as on the interior, a microprocessor uses the data to control the heat transfer direction according to a preprogrammed algorithm, harvesting heat generated by sun to heat the interior.

The proposed smart BIPV (Building integrated Photovoltaic) structure shown as preferred embodiments in the following figures will be able to change its U-value and SHGC (Solar Heat Gain Coefficient) properties according to the ambient conditions inside and outside the building. Due to the fact that the middle layer of the structure contains PV cells it absorbs about 60% of the suns irradiation as excess heat, by venting the air gaps between the glasses the proposed system can "choose" to which side, interior, or exterior, to remove most of the excess heat. In prior calculations and experiments on a double glazed structure it was found that the cells temperature might reach up to 60° C. By smart ventilation it can be chosen where to remove the excess heat. Because of the great complexity of the suggested structure both in heat transfer and fluid mechanics aspects it is easier to demonstrate the abilities, features and advantages of the smart ventilation using a more simplified model.

Consider a double glazed low-e window of which the temperature of the glasses sides facing the air gaps are $T_o=57[° C.]$; $T_i=27[° C.]$ the radiation heat transfer coefficient is given by $$h_r = \varepsilon \cdot \sigma \cdot (T_o^2, T_i^2) \cdot (T_o + T_i)$$

ε—emmisivity
σ—Stefan-Boltzman constant

The low-e coating can reduce the emissivity down to 0.1 and hence reduce the radiation heat transfer coefficient to $$h_r = 0.71 \left[ \frac{W}{m^2 \cdot K} \right].$$

The free convection coefficient of such a window can be approximated by the equation $$h_c = \frac{k}{W} \cdot 0.42 \cdot Ra_w^{0.25} \cdot Pr^{0.012} \cdot \left(\frac{H}{W}\right)^{-0.3}$$

$$Ra_w = \frac{g \cdot \Delta T \cdot W^3}{\alpha \cdot \upsilon \cdot T_f}$$

g—the gravitational acceleration
α—thermal diffusivity of air
ν—kinematic viscosity of air
σ—Stefan-Boltzman constant
Pr—Prandtle number of the air $$T_f - \text{evaluted air temprature} = \frac{T_o + T_i}{2}$$

W—air gap of the window
H—height of the window
Using air properties at film temperature, $T_f=315[° K.]$, H=1[m], W=0.02 [m]
We get $$h_c = 2\left[\frac{W}{m^2 \cdot K}\right].$$

For a forced convection induced by a fan the convection, the convection coefficient can be approximated by laminar free flow of air in the film temperature along a flat plate by the equation $$h_{c,f} = \frac{k}{H} \cdot 0.664 \sqrt{\frac{U \cdot H}{\upsilon}} \cdot Pr^{\frac{1}{3}}$$

U – air flow velocity

Hence for the given example $$h_{c,f} = 3.82 \cdot \sqrt{U} \left[\frac{W}{m^2 \cdot K}\right]$$

when the velocity units are given in $$\left[\frac{m}{s}\right],$$

remembering that this coefficient is calculated for the temperature gradient of one glaze and the film temperature the overall true forced convection coefficient is half of the one calculated above and is $$h_{c,f} = 1.91 \cdot \sqrt{U} \left[\frac{W}{m^2 \cdot K}\right]$$

For a window in the given dimensions and a length of 1 [m] a small ventilator with $$\dot{Q} = 50\left[\frac{m^3}{h}\right]$$

will yield convection coefficient of $$h_{c,f} = 2.05\left[\frac{W}{m^2 \cdot K}\right].$$

One can expect that the complex shape of the cells and prisms or other flow obstacles will cause a turbulent air flow that will increase the convection coefficient.

To summarize, this innovation is based on:
An absorbing solar energy curtain wall or skylight module comprising of:
An outer transparent surface facing towards the sun light.
At least one inner partially light absorbing plane at a distance in the direction of the incident light, creating a space, between front transparent surface and absorbing plane.
At least one additional surface facing towards an enclosed area or a room placed at a distance from partially light absorbing plane.
An enclosure element enclosing the outer perimeter of the space created by inner and outer transparent surfaces.
At least one cooling fan capable to circulate air enclosed between the inner and outer surfaces.
Mounting elements for assembling the module into a building skylight or curtain wall.
Moreover, the partially light absorbing plane consists of solar cells embedded into the plane.
Additionally, two or more cooling fans can be embedded into the module, thus cooling all cavities created between inner and outer surfaces of module.
Furthermore, the cooling fans are operated from remote by wireless means or with protruding wires into the module cavity.
In yet another alternate embodiment the partially absorbing plane consists of solar thin film technology.
Activation of the cooling fans will circulate the air inside the modules cavity thus changing its heat isolation characteristics.
For autonomic temperature control, temperature sensors are mounted outside and inside the module, activating the cooling fans to control the heat flow from partially absorbing surface.
Activation is controlled by a built-in microcontroller.
For electrical connectivity, the modules' electrical connecting elements protrude through the edge of module defined by its perimeter enclosure.
The above calculations are established on well-known analysis and show the heat transfer coefficient vis-a-vis flow rate inside one cavity enclosed by transparent window panels and absorbing PV layer. Moreover, the above analysis and methods are implemented in several embodiments of the present invention and are given for the disclosure to become more apparent wherein there is no limiting of the invention to certain specific embodiments.

BRIEF DESCRIPTION OF THE DRAWINGS

The invention will be explained in detail below with the aid of the enclosed drawings. It shows the following.

DETAILED DESCRIPTION

Figure 1:
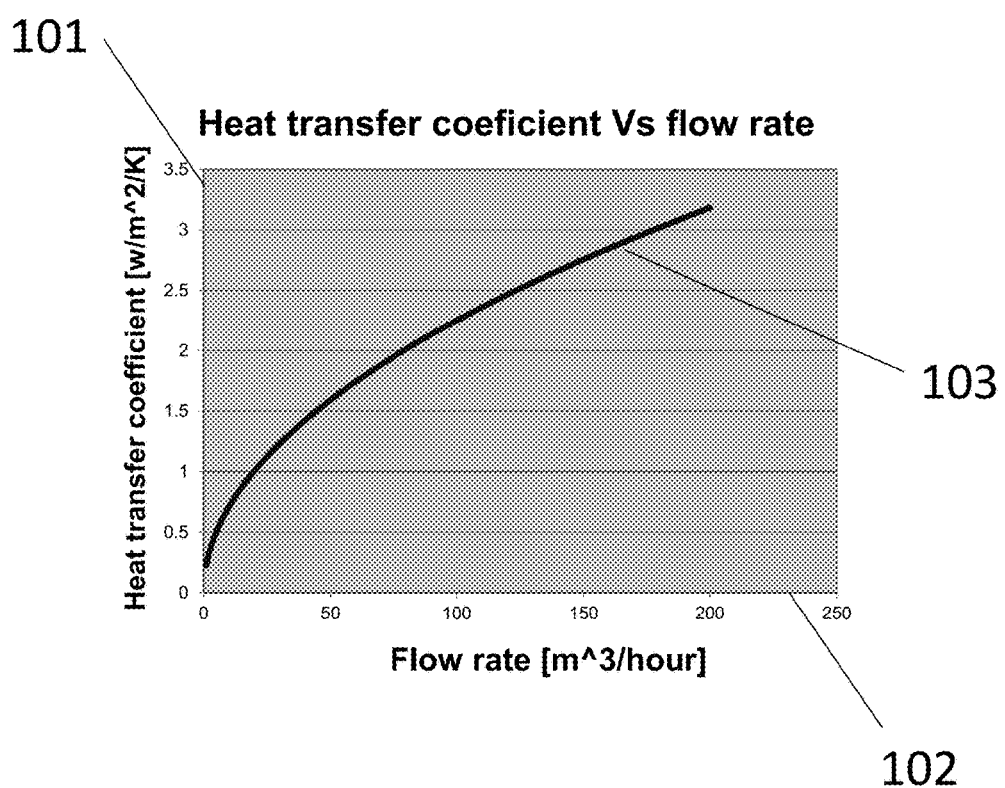
FIG. 1 is a graphical representation of the Heat Transfer Coefficient behavior vis-a-vi the flow rate dictated by built-in fans.

FIG. 1 shows a graphical representation of Heat Transfer Coefficient of an enclosed cavity with air circulation inside the cavity. The heat transfer coefficient changes significantly with the circulation magnitude. Axis 101 describes the heat transfer coefficient where axis 102 describes the air circulation magnitude. The resulting heat transfer coefficient is represented in a graphical mode 103 showing that with no air flow it is about 0.25 W/(m²K) and will increase above tenfold for high circulation rates exceeding 3 W/(m²K).

Figure 2:
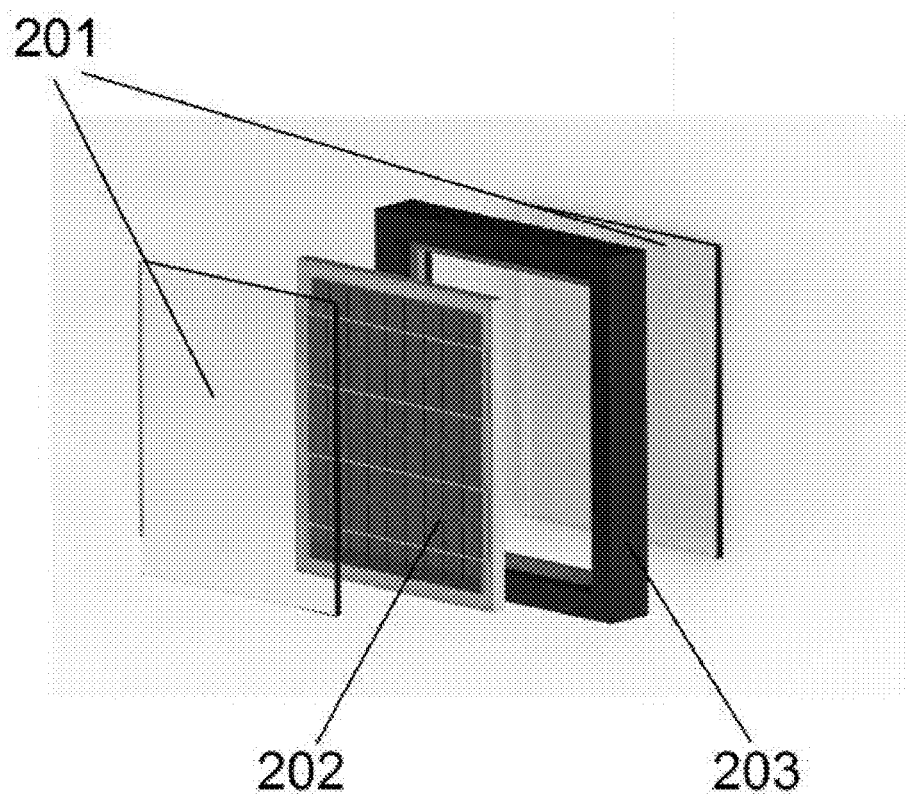
FIG. 2 is an exploded view of the proposed curtain wall device with its built-in absorbing layer, excluding the air-circulating fans.

FIG. 2 is a complete module consisting of 2 outside and inside glass panels denoted as 201 encapsulating a solar panel or heat absorbing panel denoted as 202, and having an external perimeter frame denoted as 203.

Figure 3:
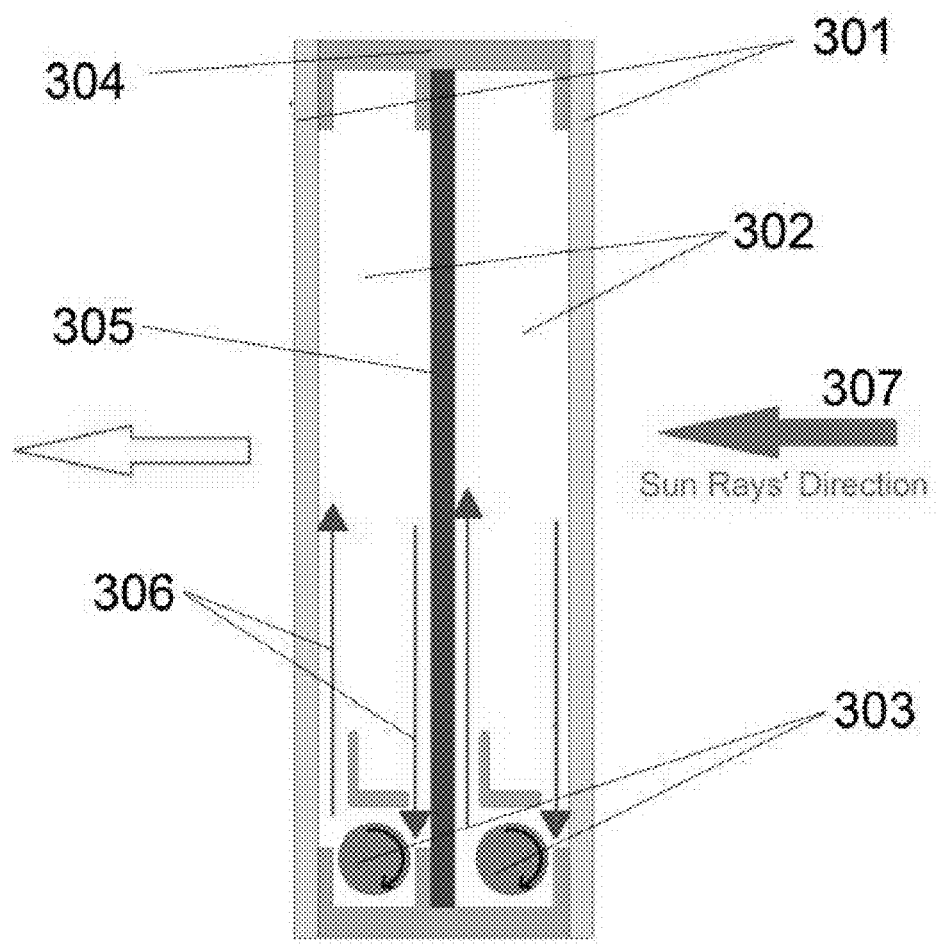
FIG. 3 is a cross section of one possible embodiment, where two longitudinal axial fans are mounted on each cavity, providing the necessary circulating capability independently.

FIG. 3 is a schematic representation of the proposed curtain wall module consisting of two inner and outer window elements denoted as 301, a heat absorbing or solar cell module in between creating two airfield cavities 302. The cavities are preferably hermetically sealed. Sun direction denoted as 307 penetrates through the glass surface and is absorbed by solar or heat absorbing elements 305. The 305 element is heated up and also starts generating electricity in the case of solar cells. For managing the accumulated heat in 305, the two tubular fans denoted as 303 are independently activated—when the fan facing the sun direction is activated the circulation of the cavity facing the sun will increase and most of the heat will be expelled to the outside since the heat transfer coefficient of this cavity is going to be high, thus heat will flow freely from 305 to the outer face. Accordingly, if the fan facing the interior is activated then the heat transfer coefficient between 305 to the inner part increases significantly, thus most of the accumulated heat will be transferred to the interior. The elements denoted as 304 represent the hermetically sealing elements disposed on the periphery of cavities, usually composed of specialty glue with built-in humidity absorbers. The arrows denoted as 306 represent air flow direction caused by 303 fans. The downwards arrow represents sucked air by 303 element, and the upwards arrow represents the blowing direction of air upwards, this will cause circulation within the hermetically sealed cavity. This circulation will increase heat transfer between the two bordering panels, significantly changing the U-Value of the cavity in the horizontal direction. According to temperature sensors and a heat target of the interior, the fans will be activated to best meet this target. For example: in wintertime, when member 305 has a higher temperature than the interior, then the fan facing the interior will be activated to transfer heat into the room. Contrary to that, in summertime the excessive heat will be expelled out, preventing unnecessary heat into the interior. Moreover, according to temperatures in and out, even without direct sun exposure the system can conduct heat in and out the interior by controlling the curtain wall heat transfer coefficient.

Figure 4:
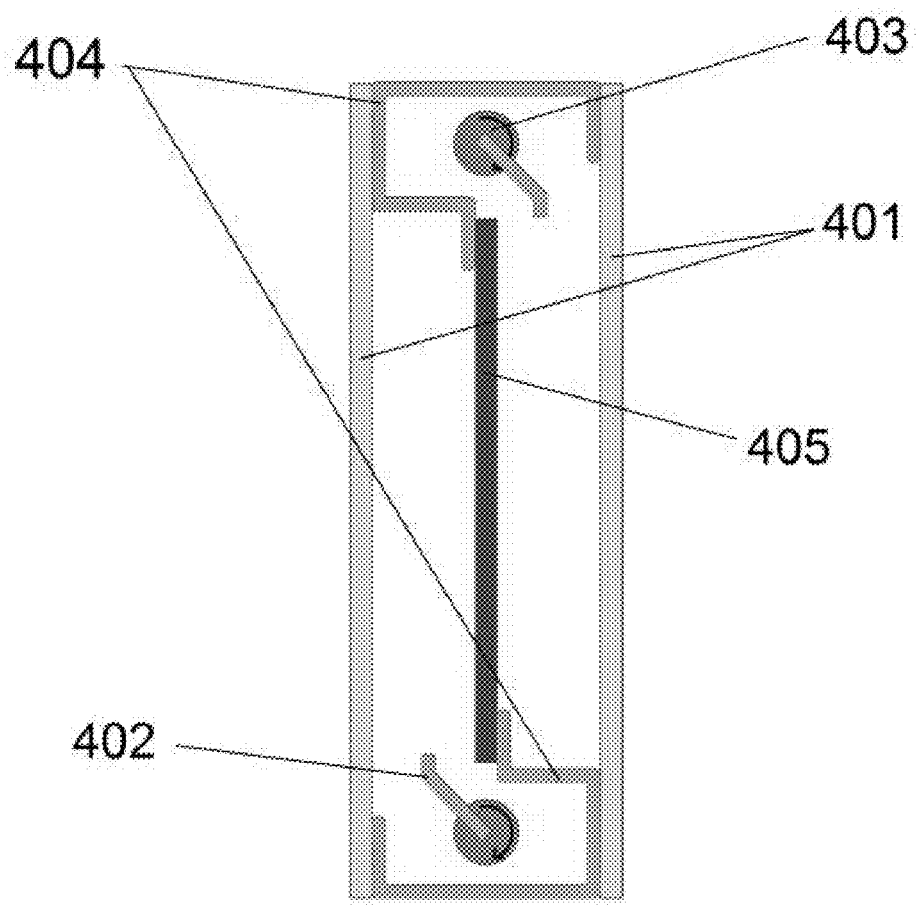
FIG. 4 is yet another cross section of an additional embodiment, with two longitudinal axial fans mounted in a different layout.

FIG. 4 is yet another embodiment with slight mechanical variation compared to FIG. 3, in order to create more room for the axial fans. In this figure, encapsulating windows are denoted as 401, the heat absorbing layer is denoted as 405 and the perimeter mechanical cross section denoted as 404 is modified to accept the larger fan denoted as 403. A special member denoted as 402 will separate the circulating air input\output directions.

Figures 5A, 5B:
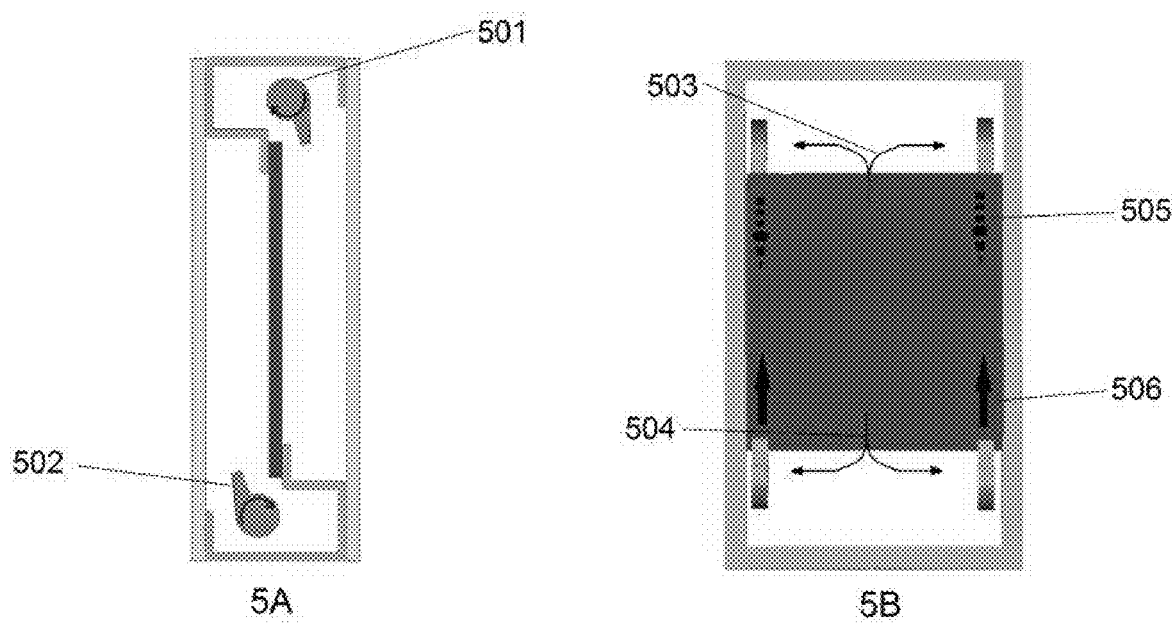
FIG. 5A is a cross section of an embodiment with centrifugal blowers, two on each cavity.
FIG. 5B is a front view of the embodiment with centrifugal blowers.

FIG. 5A is the side view of a cross section of yet another embodiment using centrifugal blowers denoted as 501 and 502. Each cavity has two centrifugal blowers arranged at the corners.

FIG. 5B is a front view of this embodiment showing air circulation in front and back cavities. Air suction direction in back cavity is shown by 503 and air suction direction in front cavity is shown by 504. Accordingly, expelled air direction is shown as 505 for back cavity and as 506 for front cavity.

The features of the invention disclosed in the specification, in the drawings and in the claims can be essential for implementation of the invention, both individually and in any combination.

What is claimed is:

1. A glass curtain wall or skylight module, comprising of:
at least two hermetically sealed cavities;
an outer transparent surface facing towards the sun light;
at least one inner partially light absorbing plane at a distance in the direction of the incident light, creating a space, between front transparent surface and absorbing plane;
at least one additional surface facing towards an enclosed area or a room placed at a distance from partially light absorbing plane;
an enclosure element enclosing the outer perimeter of the space created by inner and outer transparent surfaces;
at least one fan or blower capable to circulate enclosed air inside each said hermetically sealed cavity;
temperature sensors to independently control the fan activities and the heat transfer U-Value of said glass curtain wall or skylight module; and
mounting elements for assembling the module into said building skylight or curtain wall.

2. The glass curtain wall or skylight module of claim 1, wherein the partially light absorbing plane incorporates solar cells, which generate heat to be selectively removed by forced air circulation.

3. The glass curtain wall or skylight module of claim 1 wherein the said fans or blowers are operated from remote by wireless means or by a microcontroller programmed to activate said fans or blowers according to temperature readings.

* * * * *